(12) United States Patent
Matsugi et al.

(10) Patent No.: US 11,703,245 B2
(45) Date of Patent: Jul. 18, 2023

(54) VENTILATION SYSTEM

(71) Applicant: DAIKIN INDUSTRIES, LTD., Osaka (JP)

(72) Inventors: Yoshitaka Matsugi, Osaka (JP); Tooru Fujimoto, Osaka (JP); Ryou Fujimoto, Osaka (JP); Kazuhiro Shioyama, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/480,943

(22) Filed: Sep. 21, 2021

(65) Prior Publication Data

US 2022/0003446 A1 Jan. 6, 2022

Related U.S. Application Data

(60) Division of application No. 17/118,249, filed on Dec. 10, 2020, now Pat. No. 11,268,728, which is a
(Continued)

(30) Foreign Application Priority Data

Jul. 11, 2018 (JP) ................. 2018-131846

(51) Int. Cl.
*F24F 11/50* (2018.01)
*F24F 11/70* (2018.01)
(Continued)

(52) U.S. Cl.
CPC .............. *F24F 11/50* (2018.01); *F24F 7/007* (2013.01); *F24F 11/70* (2018.01); *F24F 2110/12* (2018.01); *F24F 2110/20* (2018.01)

(58) Field of Classification Search
CPC ............... F24F 11/0001; F24F 11/54; F24F 2007/0025; F24F 7/06; F24F 7/08
See application file for complete search history.

(56) References Cited

U.S. PATENT DOCUMENTS

| 4,765,231 A | 8/1988 | Aniello |
| 5,119,987 A | 6/1992 | Kobayashi |
| (Continued) | | |

FOREIGN PATENT DOCUMENTS

| CN | 104076758 A | 10/2014 |
| CN | 105823142 A | 8/2016 |
| (Continued) | | |

OTHER PUBLICATIONS

International Search Report of corresponding PCT Application No. PCT/JP2019/023543 dated Jul. 9, 2019.
(Continued)

*Primary Examiner* — Nelson J Nieves
(74) *Attorney, Agent, or Firm* — Global IP Counselors, LLP

(57) ABSTRACT

A ventilation system includes a first ventilation device, a second ventilation device, a sensor, and an electronic controller. The first ventilation device includes a first fan. The second ventilation device includes a second fan. The sensor is attached to the first ventilation device. The sensor is configured to detect a state of air and to transmit a detection signal indicative of the detected state of air. The electronic controller is configured to receive the detection signal of the sensor and to control the first ventilation device and the second ventilation device based on the detection signal.

8 Claims, 7 Drawing Sheets

Related U.S. Application Data continuation of application No. PCT/JP2019/023543, filed on Jun. 13, 2019.

(51) Int. Cl.
*F24F 7/007* (2006.01)
*F24F 110/20* (2018.01)
*F24F 110/12* (2018.01)

(56) References Cited

U.S. PATENT DOCUMENTS

| | | |
|---|---|---|
| 5,205,783 A | 4/1993 | Dieckert et al. |
| 5,279,609 A | 1/1994 | Meckler |
| 5,282,770 A | 2/1994 | Shibata |
| 10,371,399 B1 | 8/2019 | Rodriguez |
| 10,731,882 B2 | 8/2020 | Abrishamkar et al. |
| 10,914,479 B2 | 2/2021 | Abrishamkar et al. |
| 2002/0102936 A1 | 8/2002 | Daunler |
| 2008/0017723 A1 | 1/2008 | Johnson et al. |
| 2012/0094590 A1 | 4/2012 | Lee et al. |
| 2012/0318010 A1 | 12/2012 | Matsumoto et al. |
| 2013/0019747 A1 | 1/2013 | Innes |
| 2013/0140016 A1 | 6/2013 | Storm et al. |
| 2014/0285013 A1 | 9/2014 | Noguchi et al. |
| 2015/0073732 A1 | 3/2015 | Lee et al. |
| 2015/0338133 A1 | 11/2015 | Havard, Jr. et al. |
| 2017/0059199 A1 | 3/2017 | Zhang et al. |
| 2017/0138624 A1 | 5/2017 | Kriz et al. |
| 2017/0138814 A1 | 5/2017 | Dempsey et al. |
| 2017/0159963 A1 | 6/2017 | Matsugi et al. |
| 2018/0106491 A1 | 4/2018 | Abrishamkar et al. |
| 2018/0135878 A1 | 5/2018 | Iura et al. |
| 2018/0195783 A1 | 7/2018 | Jung et al. |
| 2018/0372361 A1 | 12/2018 | Fukumoto et al. |
| 2018/0372364 A1 | 12/2018 | Elwell |
| 2019/0017716 A1 | 1/2019 | Osamor |
| 2019/0101303 A1 | 4/2019 | Kaliyaperumal et al. |
| 2019/0162009 A1 | 5/2019 | Hall et al. |
| 2019/0170375 A1 | 6/2019 | Poerschke et al. |
| 2020/0158350 A1 | 5/2020 | Song et al. |
| 2020/0179867 A1 | 6/2020 | Koizumi et al. |
| 2020/0378645 A1 | 12/2020 | Doi |

FOREIGN PATENT DOCUMENTS

| | | | |
|---|---|---|---|
| DE | 202 18 363 U1 | | 2/2004 |
| JP | 09196447 A | * | 7/1997 |
| JP | 2013-87969 A | | 5/2013 |
| JP | 2015-143593 A | | 8/2015 |
| KR | 10-0676256 B1 | | 2/2007 |

OTHER PUBLICATIONS

International Preliminary Report of corresponding PCT Application No. PCT/JP2019/023543 dated Jan. 21, 2021.

* cited by examiner

VENTILATION SYSTEM

CROSS-REFERENCE TO RELATED APPLICATIONS

This application is a divisional application of U.S. patent application Ser. No. 17/118,249, filed on Dec. 10, 2020, which is continuation of International Application No. PCT/JP2019/023543 filed on Jun. 13, 2019, which claims priority to Japanese Patent Application No. 2018-131846 filed on Jul. 11, 2018. The entire disclosures of these applications are incorporated by reference herein.

BACKGROUND

Field of Invention

The present disclosure relates to a ventilation system.

Background Information

Ventilation devices for ventilating a room have been known.

A ventilation device of Japanese Unexamined Patent Publication No. 2015-143593 includes an air supply passage in which an air supply fan is disposed, and an exhaust passage in which an exhaust fan is disposed. The air supply passage is provided with a sensor (for example, a humidity sensor) for detecting a state of air. When the air supply fan and the exhaust fan are operated, indoor air is sucked into the exhaust passage, and the outdoor air is sucked into the air supply passage at the same time. The air sucked in flows through a total heat exchanger. The total heat exchanger transfers latent heat and sensible heat between the indoor air and the outdoor air. The indoor air that has passed through the total heat exchanger is discharged to the outside. The outdoor air that has passed through the total heat exchanger is supplied to the indoor space.

In the ventilation device of Japanese Unexamined Patent Publication No. 2015-143593, a control unit controls the air supply fan and the exhaust fan. For example, the control unit controls the air supply fan and the exhaust fan to start or stop based on a detection signal of the humidity sensor.

SUMMARY

In a first aspect, a ventilation system includes a first ventilation device and a second ventilation device. The first ventilation device includes a first fan. The second ventilation device includes a second fan. A sensor is attached to the first ventilation device. The sensor is configured to detect a state of air and transmit a detection signal indicative of the detected state of air. An electronic controller is configured to receive a detection signal of the sensor and to control the first ventilation device and the second ventilation device based on the detection signal.

In a second aspect, a ventilation system includes a first ventilation device and a second ventilation device. The first ventilation device includes a first fan and a first electronic controller. The second ventilation device includes a second fan and a second electronic controller. A sensor is attached to the first ventilation device. The sensor is configured to detect a state of air and transmit a detection signal indicative of the detected state of air. A third electronic controller is configured to receive a detection signal of the sensor and to transmit the detection signal to the first electronic controller and the second electronic controller. The first electronic controller is configured to control the first ventilation device based on the detection signal transmitted from the third electronic controller. The second electronic controller is configured to control the second ventilation device based on the detection signal transmitted from the third electronic controller.

DETAILED DESCRIPTION OF EMBODIMENT(S)

Figure 1:
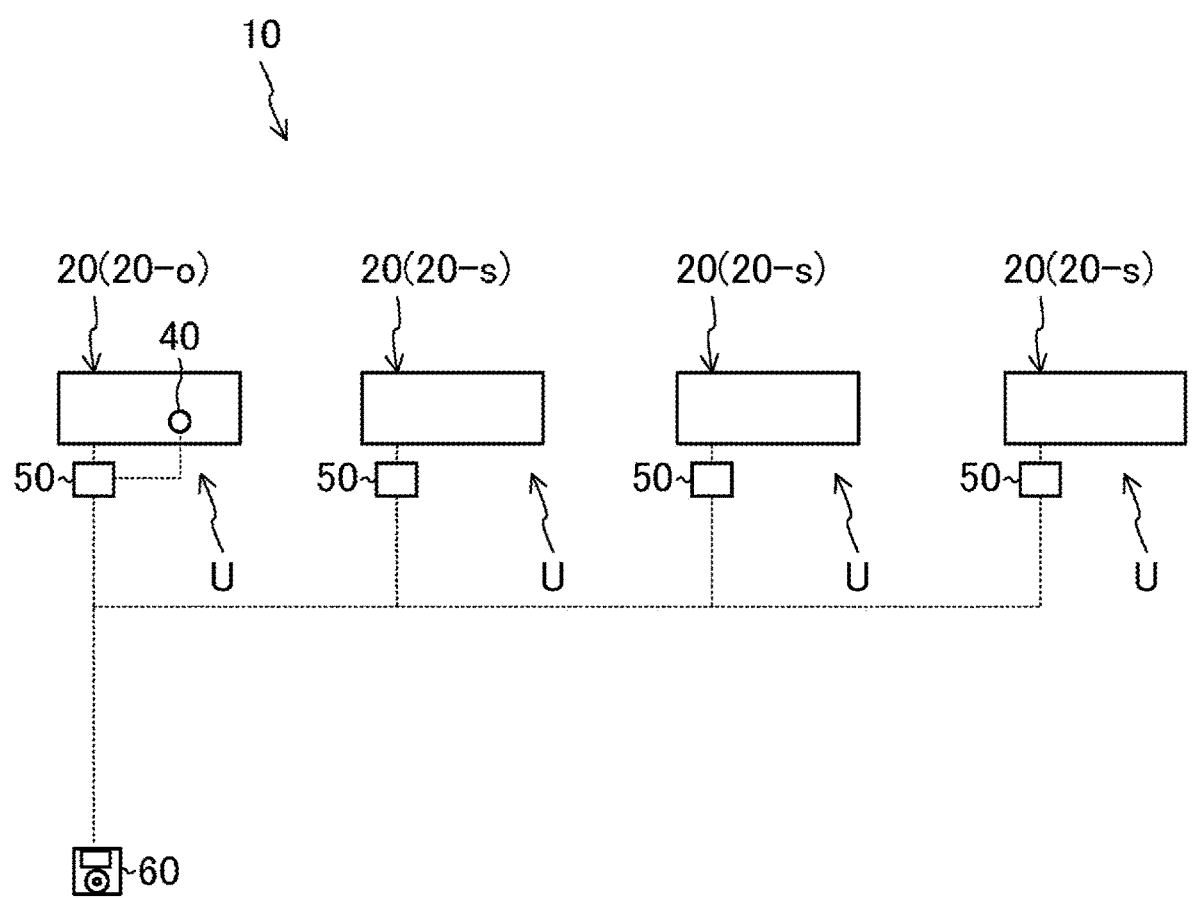
FIG. 1 is an overall schematic diagram illustrating a general configuration of a ventilation system according to an embodiment.

Embodiments of the present disclosure will be described below with reference to the drawings. It should be noted that the following embodiments are merely preferred examples, and are not intended to limit the scope, applications, or use of the present disclosure. Embodiment A ventilation system (10) according to an embodiment includes a plurality of ventilation units (U). The plurality of ventilation units (U) are configured to ventilate the same indoor space. The ventilation units (U) are arranged, for example, above the ceiling. As schematically shown in FIG. 1, the ventilation system (10) of the present example is provided with four ventilation units (U). However, the number of the ventilation units (U) is not limited thereto, and the ventilation system (10) may include any number of the ventilation units (U) as long as at least two ventilation units (U) are provided. Each ventilation unit (U) includes a ventilation device (20) and a control device (50).

Ventilation Device

Figure 2:
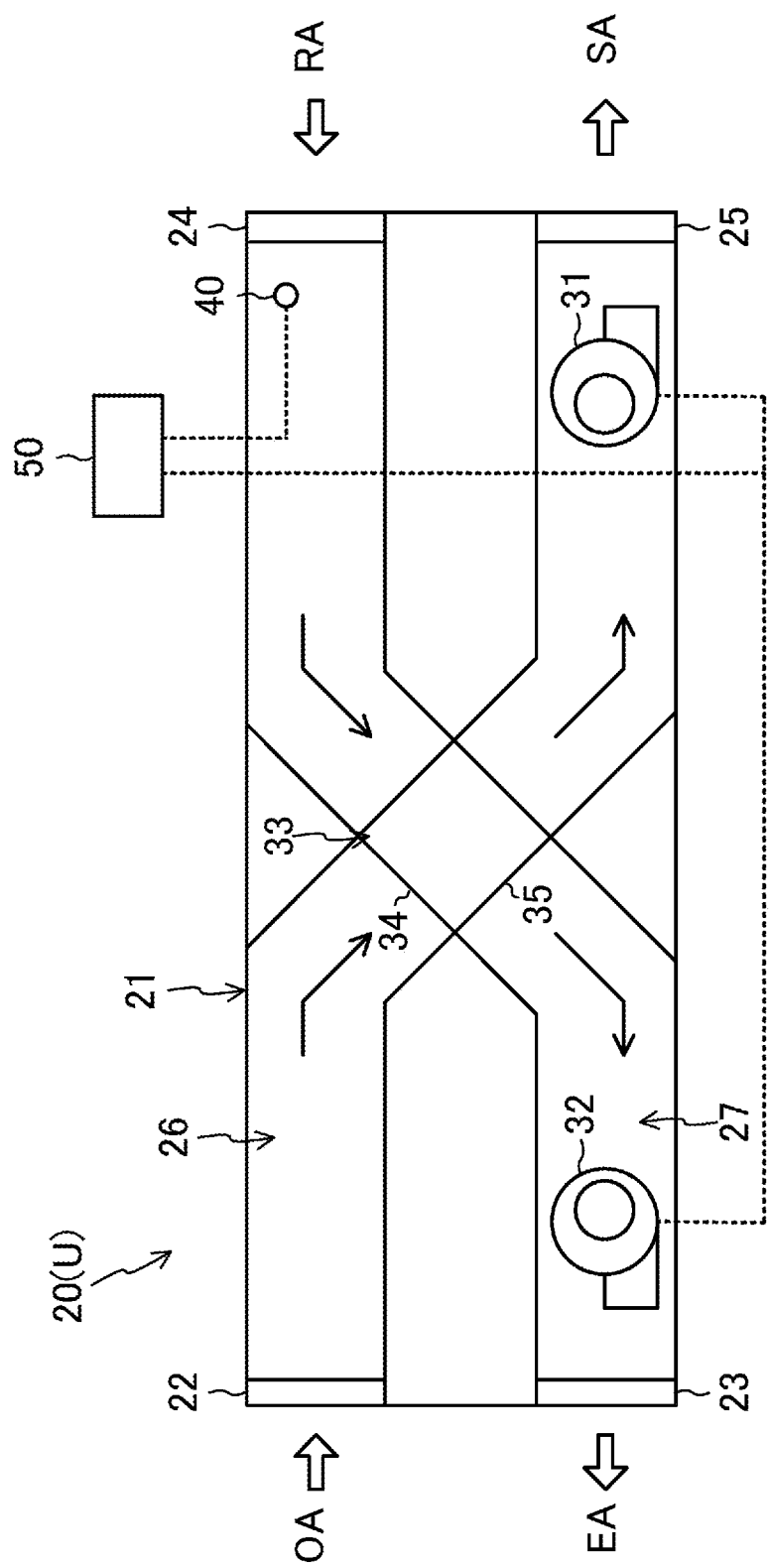
FIG. 2 is a schematic diagram illustrating a ventilation device.

A schematic configuration of each ventilation device (20) will be described with reference to FIG. 2. Each ventilation device (20) includes a casing (21), an air supply fan (31), an exhaust fan (32), a total heat exchanger (33), and a carbon dioxide concentration sensor (40).

The casing (21) is formed in a hollow box-like shape. The casing (21) includes an outdoor air port (22), an exhaust port (23), an indoor air port (24), and an air supply port (25). Each of the outdoor air port (22) and the exhaust port (23) communicates with the outdoor space via a duct. Each of the indoor air port (24) and the air supply port (25) communicates with the indoor space via a duct.

Inside the casing (21), an air supply passage (26) and an exhaust passage (27) are formed. The air supply passage

(26) extends from the outdoor air port (22) to the air supply port (25). The exhaust passage (27) extends from the indoor air port (24) to the exhaust port (23). The air supply fan (31) is disposed in the air supply passage (26), and an exhaust fan (32) is disposed in the exhaust passage (27).

The air supply fan (31) and the exhaust fan (32) are comprised of sirocco fans, for example. Each of the air supply fan (31) and the exhaust fan (32) are configured such that their air volumes are variable. Specifically, the air volumes of the air supply fan (31) and the exhaust fan (32) of the present example are switchable in multiple steps depending on a fan tap.

The total heat exchanger (33) is disposed so as to be part of each of the air supply passage (26) and the exhaust passage (27). The total heat exchanger (33) has a first passage (34) connected to the air supply passage (26), and a second passage (35) connected to the exhaust passage (27). The total heat exchanger (33) transfers latent heat and sensible heat between first air flowing through the first passage (34) and second air flowing through the second passage (35).

The carbon dioxide concentration sensor (40) detects carbon dioxide concentration of the indoor air. That is, the carbon dioxide concentration sensor (40) serves as a sensor detecting a state of the air (carbon dioxide concentration, in this example). The carbon dioxide concentration sensor (40) is disposed in the exhaust passage (27) upstream from the total heat exchanger (33).

Control Device

The control device (50) includes, for example, a control board, a processor (for example, a microcontroller) mounted on the control board, and a memory device (for example, a semiconductor memory) for storing software for operating the processor.

Figure 3:
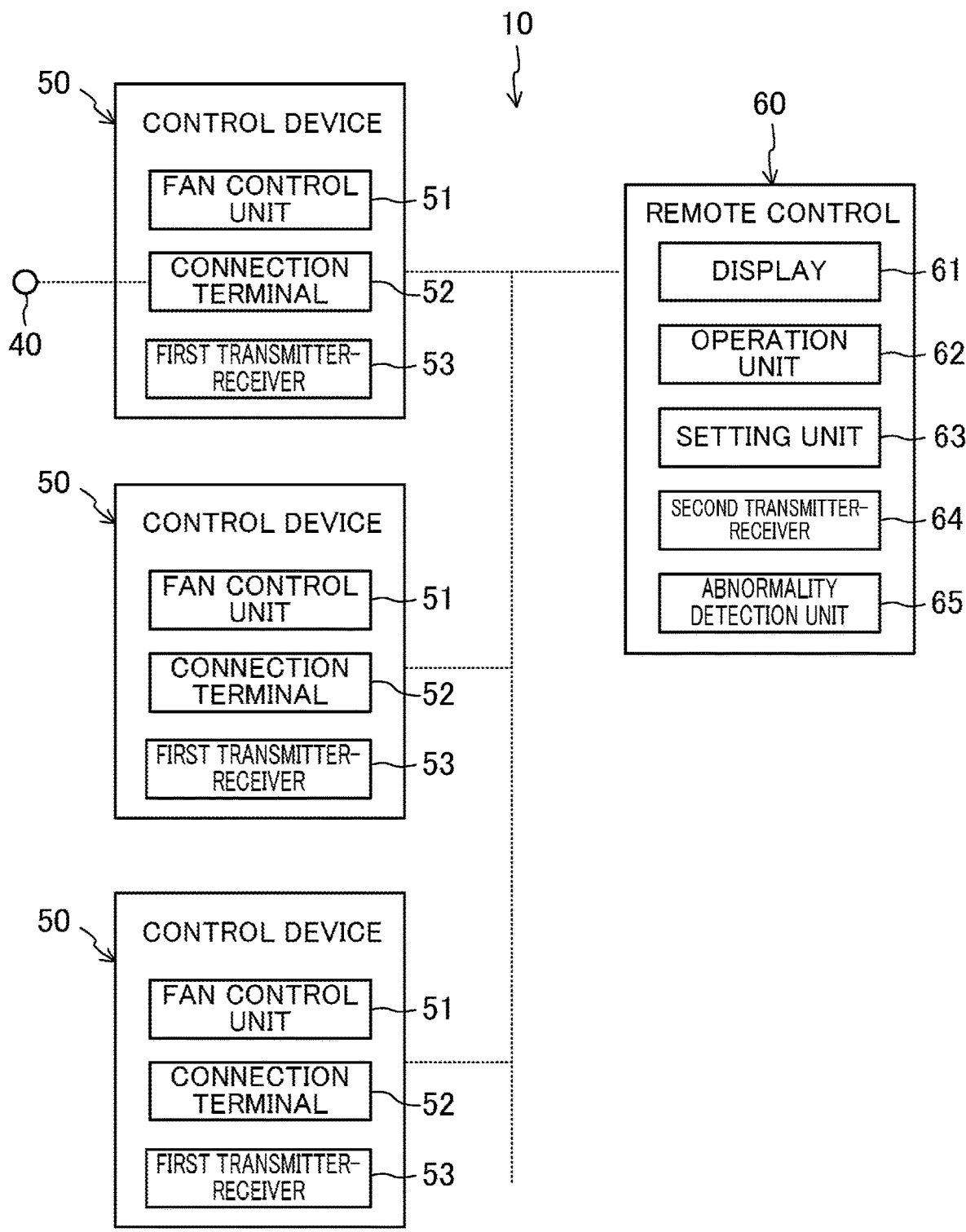
FIG. 3 is a block diagram illustrating control devices of the ventilation system and a remote control.

As shown in FIG. 3, the control device (50) includes a fan control unit (51) for controlling the air supply fan (31) and the exhaust fan (32), a connection terminal (52) to which the carbon dioxide concentration sensor (40) is detachably connected, and a first transmitter-receiver (53) for transmitting and receiving a signal to and from a remote control (60).

The fan control unit (51) controls the air supply fan (31) and the exhaust fan (32) based on a detection signal of the carbon dioxide concentration sensor (40). Specifically, the fan control unit (51) outputs, to the air supply fan (31) and the exhaust fan (32), a control signal for turning the air supply fan (31) and the exhaust fan (32) on and off and switching the air volume, based on the detection signal.

A signal wire of the carbon dioxide concentration sensor (40) is connected to the connection terminal (52). Basically in the ventilation system (10) of the present embodiment, the carbon dioxide concentration sensor (40) is not connected to all of the connection terminals (52). In other words, in the ventilation system (10), the plurality of ventilation devices (20) share a single carbon dioxide concentration sensor (40).

Each first transmitter-receiver (53) transmits the detection signal detected by the carbon dioxide concentration sensor (40) of a source ventilation device (20-o) to the remote control (60). The source ventilation device (20-o) described herein is a first ventilation device to which the carbon dioxide concentration sensor (40) is attached. The remote control (60) transmits the received detection signal to the first transmitter-receiver (53) of the source ventilation device (20-o) and each of destination ventilation devices (20-s). The destination ventilation devices (20-s) described herein are second ventilation devices for which the detection signal is shared. As a result, the detection signal of the source ventilation device (20-o) is indirectly transmitted to the first transmitter-receivers (53) of the source ventilation device (20-o) and the destination ventilation devices (20-s) (the details will be described later).

Remote Control

As shown in FIG. 1, the remote control (60) is shared for all of the ventilation units (U). The remote control (60) transmits an operation command to each ventilation device (20). As shown in FIG. 3, the remote control (60) includes a display (61), an operation unit (62), a setting unit (63), a second transmitter-receiver (64), and an abnormality determination unit (65).

The display (61) is comprised of a liquid crystal monitor, for example. The operation unit (62) includes a cursor key, a button, and the like. The user, the contractor, or the like may operate the operation unit (62) to change various types of settings or output an operation command to each ventilation unit (U).

In the setting unit (63) of the present embodiment, the source ventilation device (20-o) and the destination ventilation devices (20-s) are set from among all of the ventilation devices (20). It is also possible to set, in the setting unit (63), an independent ventilation device (20-i) that serves neither as a source sharing with others a carbon dioxide concentration sensor (40) nor as destinations using the concentration sensor (40) in common, from among all of the ventilation devices (20). The independent ventilation device (20-i) is a third ventilation device that independently operates under self-control based on the carbon dioxide concentration sensor (40) connected to the independent ventilation device (20-i) itself It is possible, in the setting unit (63), to set the source ventilation device (20-o), the destination ventilation device (20-s), and the independent ventilation device (20-i) from among all of the ventilation devices (20), while changing them freely in accordance with the attachment state of the carbon dioxide concentration sensor (40).

Detection signals of the carbon dioxide concentration sensor (40) are transmitted to the second transmitter-receiver (64) from the first transmitter-receivers (53) of all of the ventilation devices (20). Strictly speaking, the second transmitter-receiver (64) receives the detection signal from the first transmitter-receiver (53) of the source ventilation device (20-o). The second transmitter-receiver (64) attempts to receive the detection signals from the destination ventilation devices (20-s). However, values of these detection signals are zero. This is because the destination ventilation devices (20-s) have no carbon dioxide concentration sensors (40) attached thereto, and the detection signals of the destination ventilation devices (20-s) are substantially zero. The second transmitter-receiver (64) attempts to receive the detection signals from all of the ventilation devices (20), including both the source ventilation device (20-o) and the destination ventilation devices (20-s).

From among the signals obtained in this way, the second transmitter-receiver (64) transmits the detection signal received from the source ventilation device (20-o) to the source ventilation device (20-o) and the destination ventilation devices (20-s). Accordingly, the source ventilation device (20-o) and the destination ventilation devices (20-s) are controlled based on the detection signal of the carbon dioxide concentration sensor (40) connected to the source ventilation device (20-o) (details will be described later).

The abnormality determination unit (65) determines an abnormality of the carbon dioxide concentration sensor (40) connected to the source ventilation device (20-o). That is, the abnormality determination unit (65) outputs a signal indicating an abnormality if the second transmitter-receiver (64) does not receive an appropriate detection signal from the control device (50) of the ventilation device (20) set to be the source ventilation device (20-*o*). In the remote control (60) of the present example, a sign indicating an abnormality is displayed on the display (61) in synchronization with the abnormality signal. Ventilation Operation The basic operation of the ventilation device (20) will be described with reference to FIG. 2. The air supply fan (31) and the exhaust fan (32) operate during the ventilation operation of the ventilation device (20). As a result, the outdoor air (OA) is taken into the air supply passage (26) through the outdoor air port (22), and the indoor air (RA) is taken into the exhaust passage (27) through the indoor air port (24) at the same time.

The outdoor air flowing through the air supply passage (26) then flows through the first passage (34) of the total heat exchanger (33). The indoor air flowing through the exhaust passage (27) then flows through the second passage (35) of the total heat exchanger (33). The total heat exchanger (33) transfers the sensible heat and the latent heat between the air flowing through the first passage (34) and the air flowing through the second passage (35). Specifically, in summer, for example, sensible heat and latent heat of the outdoor air (first air) having relatively high temperature and high humidity are applied to the indoor air (second air) having relatively low temperature and low humidity. In winter, for example, sensible heat and latent heat of the indoor air (second air) having relatively high temperature and high humidity are applied to the outdoor air (first air) having relatively low temperature and low humidity.

The first air that has passed through the total heat exchanger (33) is supplied through the air supply port (25) to the indoor space as supply air (SA). The second air that has passed through the total heat exchanger (33) is discharged through the exhaust port (23) to the outdoor space as exhaust air (EA).

In such a ventilation operation, the air volumes of the air supply fan (31) and the exhaust fan (32) are appropriately adjusted in accordance with the carbon dioxide concentration detected by the carbon dioxide concentration sensor (40). Specifically, when the carbon dioxide concentration detected by the carbon dioxide concentration sensor (40) is, for example, lower than a predetermined value, the control device (50) increases the air volumes of the air supply fan (31) and the exhaust fan (32). As a result, the ventilation volume in the indoor space increases. Further, when the carbon dioxide concentration detected by the carbon dioxide concentration sensor (40) is, for example, higher than the predetermined value, the control device (50) reduces the air volumes of the air supply fan (31) and the exhaust fan (32). As a result, the power of the air supply fan (31) and the exhaust fan (32) may be reduced.

Attachment of Sensor and Exemplary Settings of Setting Unit

In the ventilation system (10), a single carbon dioxide concentration sensor (40) may be used to control the plurality of ventilation devices (20). Attachment of the carbon dioxide concentration sensor (40) and exemplary settings of the setting unit (63) will be described with reference to specific examples.

Figure 4:
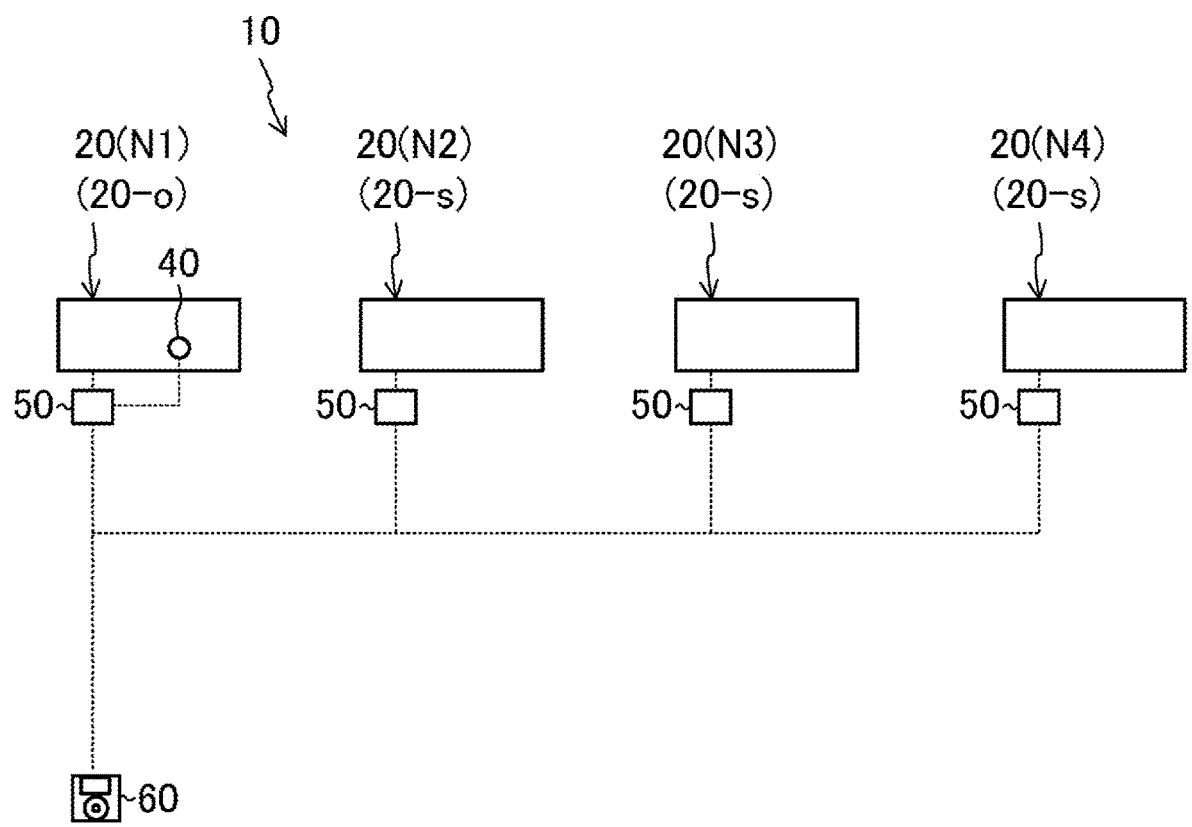
FIG. 4 is a configuration diagram illustrating a first example of the ventilation system having a carbon dioxide concentration sensor attached thereto and an exemplary setting of a setting unit corresponding to the first example.

The ventilation system (10) of the example shown in FIG. 4 is provided with four ventilation devices (20). The four ventilation devices (20) are comprised of a ventilation device No. 1 (N1), a ventilation device No. 2 (N2), a ventilation device No. 3 (N3), and a ventilation device No. 4 (N4). The carbon dioxide concentration sensor (40) is attached to the ventilation device No. 1 (N1). Specifically, the carbon dioxide concentration sensor (40) is connected to the connection terminal (52) of the control device (50) associated with the ventilation device No. 1 (Ni). No carbon dioxide concentration sensor (40) is attached to any of the ventilation device No. 2 (N2), the ventilation device No. 3 (N3), and the ventilation device No. 4 (N4). That is, the carbon dioxide concentration sensor (40) is not connected to any of the connection terminals (52) of the control devices (50) associated with the ventilation device No. 2 (N2), the ventilation device No. 3 (N3), and the ventilation device No. 4 (N4).

The contractor or the user determines the settings in the setting unit (63) in accordance with the attachment state of the carbon dioxide concentration sensor (40). The settings in the setting unit (63) are determined through the operation unit (62) of the remote control (60).

In the present example, the carbon dioxide concentration sensor (40) is attached to the ventilation device No. 1 (N1), and thus the ventilation device No. 1 (N1) is set to be the "source" (source ventilation device (20-*o*)). In the present example, the ventilation device No. 2 (N2), the ventilation device No. 3 (N3), and the ventilation device No. 4 (N4) are set to be the "destinations" (destination ventilation devices (20-*s*)). As a result, it is possible to share the detection signal of the carbon dioxide concentration sensor (40) of the ventilation device No. 1 (N1) to control all of the ventilation devices (20).

Control Operation

Figure 5:
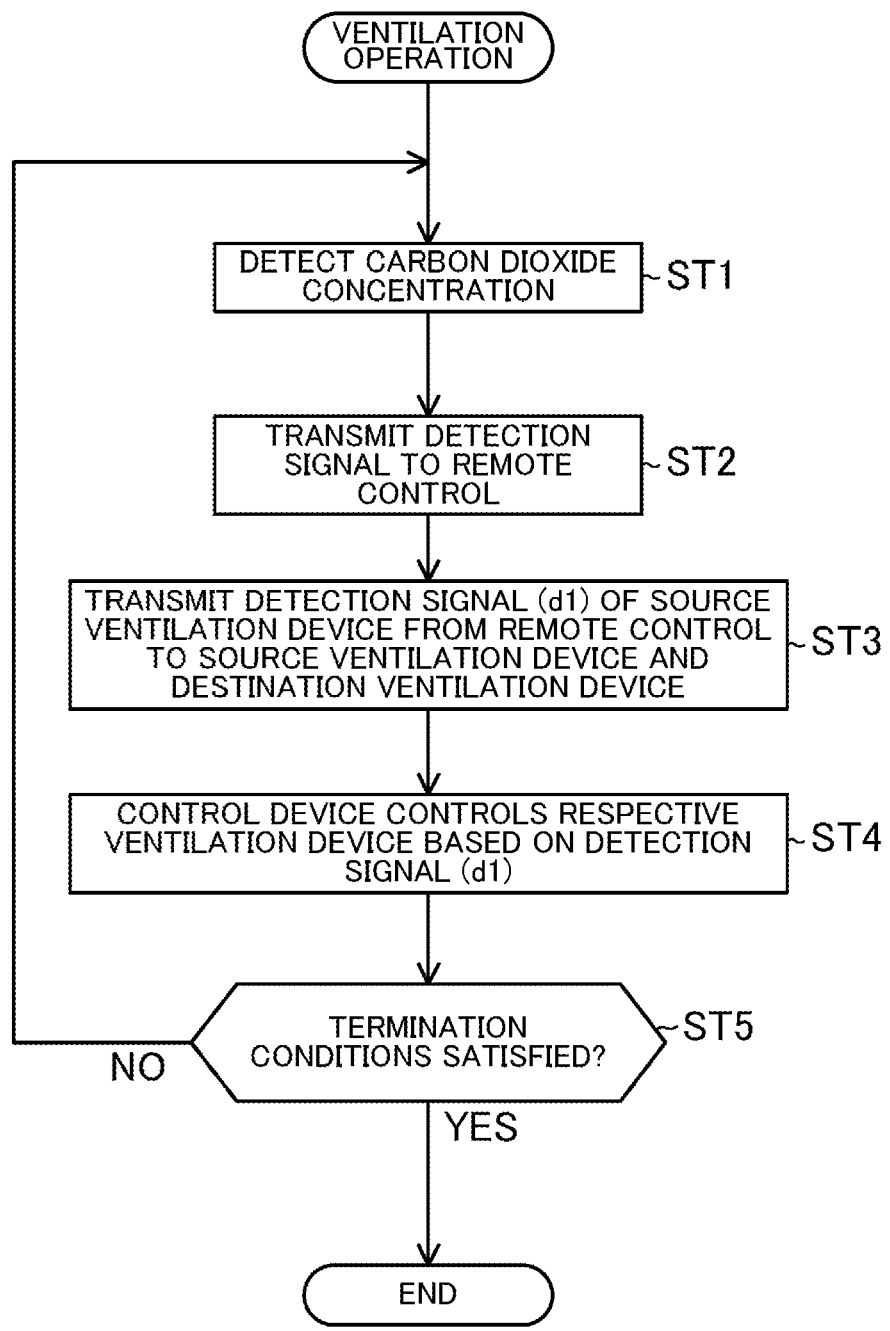
FIG. 5 is a flowchart showing a control of a ventilation operation.

The control operation of the ventilation device (20) will be described with reference to the flowchart shown in FIG. 5.

When the ventilation operation starts, the carbon dioxide concentration sensor (40) detects the carbon dioxide concentration of the indoor air. In the present example, the detection signal (d1) indicating the carbon dioxide concentration is detected by the carbon dioxide concentration sensor (40) of the ventilation device No. 1 (N1).

Next, in a step ST2, the detection signals from the first transmitter-receivers (53) of all of the control devices (50) are transmitted to the second transmitter-receiver (64) of the remote control (60) (step ST2). In the present example, the detection signal of the ventilation device No. 1 (N1) serves as a source detection signal (d1). On the other hand, the detection signals of the other ventilation devices, i.e., the ventilation device No. 2 (N2), the ventilation device No. 3 (N3), and the ventilation device No. 4 (N4) are substantially zero.

Next, in step ST3, the detection signal (d1) of the ventilation device (20) set to be the source (i.e., the ventilation device No. 1 (N1)) in the setting unit (63) is transmitted from the second transmitter-receiver (64) of the remote control (60) to the respective ventilation devices (20). Specifically, the second transmitter-receiver (64) transmits the detection signal (d1) to the ventilation device No. 1 (N1) which is the source ventilation device (20-*o*). At the same time, the second transmitter-receiver (64) transmits the detection signal (d1) to the first transmitter-receivers (53) of the ventilation devices No. 2 to No. 4 (N2, N3, N4) which are the destination ventilation devices (20-*s*). Thus, the detection signals of the respective control devices (50) are rewritten into the detection signal (d1) transmitted from the second transmitter-receiver (64).

Each control device (50) controls the associated ventilation device (20) based on the detection signal (d1) rewritten in this manner (step ST4). Specifically, the control device (50) associated with the ventilation device No. 1 (N1) controls the air supply fan (31) and the exhaust fan (32) of the ventilation device No. 1 (N1) based on the detection signal (d1). The control devices (50) of each of the ventilation devices No. 2 to No. 4 (N2, N3, N4) control the air supply fan (31) and the exhaust fan (32) of the ventilation devices No. 2 to No. 4 (N2, N3, N4), respectively, based on the detection signal (d1). Since the ventilation devices (20) described herein are configured to ventilate the same indoor space, it is possible to perform appropriate ventilation operation even when the carbon dioxide concentration sensor (40) is shared.

In the present example, the control in steps ST1 to ST4 is performed repeatedly. When the predetermined termination conditions are satisfied in step ST5, the ventilation operation ends.

Abnormality Display

Suppose for example that in the example shown in FIG. 4 the carbon dioxide concentration sensor (40) is not correctly connected to the control device (50) of the ventilation device No. 1 (N1). In this case, the second transmitter-receiver (64) does not correctly receive the detection signal (d1) from the ventilation device No. 1 (N1) which is the source ventilation device (20-*o*). In this case, the abnormality determination unit (65) outputs a signal indicating an abnormality. The display unit (61), upon receipt of this signal, displays a sign indicating the abnormality. As a result, the contractor or the user can quickly recognize the connection error, the connection failure, breakage, or the like of the carbon dioxide concentration sensor (40).

Another Setting Example 1

Figure 6:
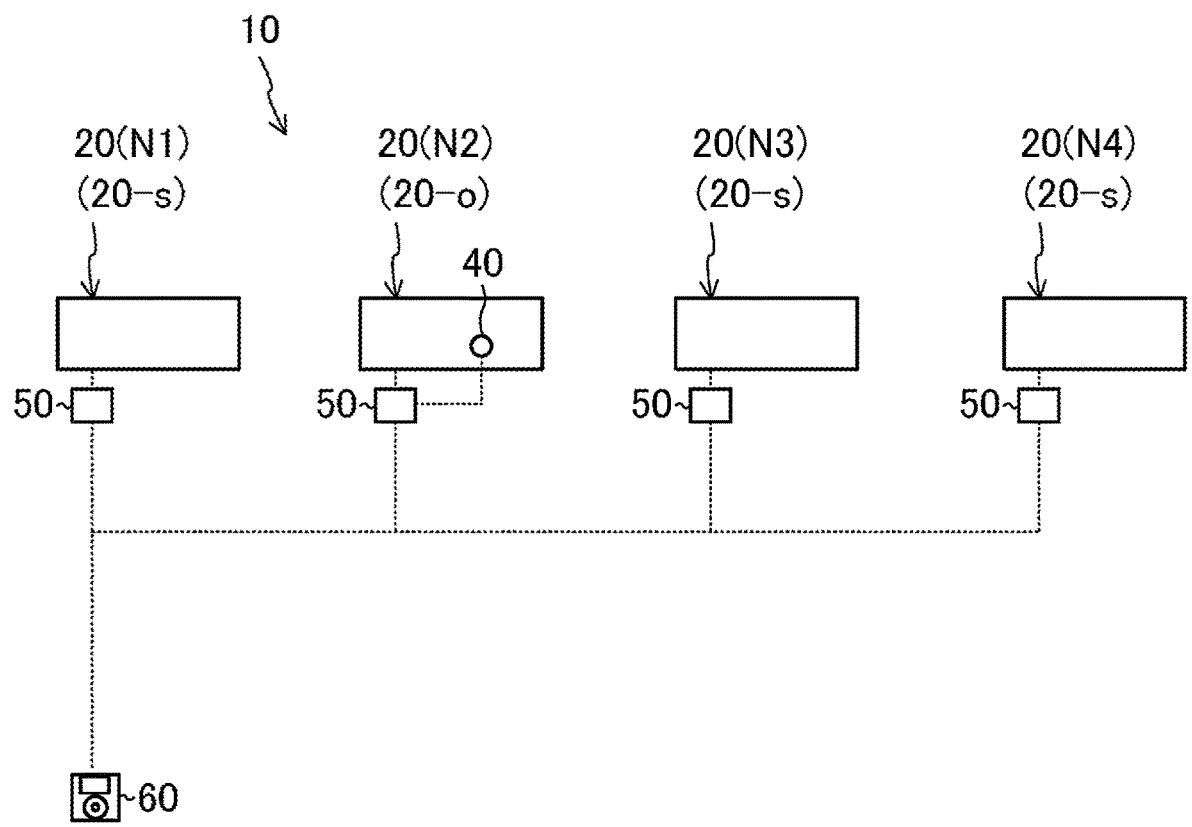
FIG. 6 is a configuration diagram illustrating a second example of the ventilation system having a carbon dioxide concentration sensor attached thereto and an exemplary setting of a setting unit corresponding to the second example.

In the example shown in FIG. 6, the carbon dioxide concentration sensor (40) is attached to the ventilation device No. 2 (N2). On the other hand, no carbon dioxide concentration sensor (40) is attached to any of the ventilation device No. 1 (N1), the ventilation device No. 3 (N3), and the ventilation device No. 4 (N4). In this case, the ventilation device No. 2 (N2) is set to be the "source" in the setting unit (63), and the ventilation device No. 1 (N1), the ventilation device No. 3 (N3), and the ventilation device No. 4 (N4) to are set to be the "destinations." In this case, the detection signal (d2) of the ventilation device No. 2 (N2) is transmitted to the second transmitter-receiver (64) of the remote control (60). The second transmitter-receiver (64) transmits the detection signal (d2) to the ventilation unit No. 2 (N2) which is the source ventilation device (20-*o*), and to the ventilation device No. 1 (N1), the ventilation device No. 3 (N3), and the ventilation device No. 4 (N4) which are the destination ventilation devices (20-*s*). Accordingly, the detection signal (d2) is shared to control the ventilation devices No. 1 to No. 4 (N1, N2, N3, N4).

Another Setting Example 2

Figure 7:
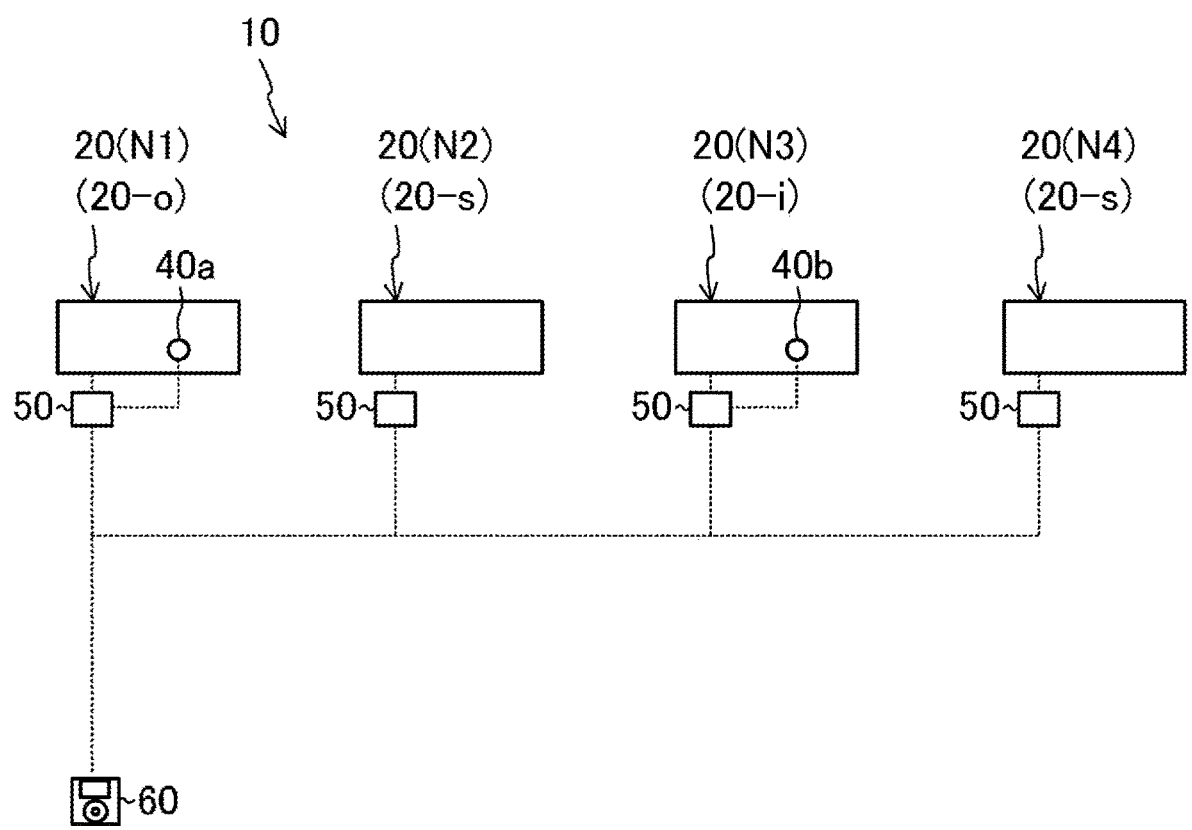
FIG. 7 is a configuration diagram illustrating a third example of the ventilation system having a carbon dioxide concentration sensor attached thereto and an exemplary setting of a setting unit corresponding to the third example.

In the example shown in FIG. 7, a first carbon dioxide concentration sensor (40*a*) is attached to the ventilation device No. 1 (N1), and a second carbon dioxide concentration sensor (40b) is attached to the ventilation device No. 3 (N3). In the setting unit (63) of the present example, the detection signal of the first carbon dioxide concentration sensor (40*a*) is shared with the ventilation device No. 1 (Ni), the ventilation device No. 2 (N2), and the ventilation device No. 4 (N4). On the other hand, the detection signal of the second carbon dioxide concentration sensor (40*b*) is used only in the ventilation device No. 3 (N3) which is set to be an independent ventilation device (20-*i*).

That is, in the setting unit (63), the ventilation device No. 1 (N1) is set to be the "source" (source ventilation device (20-*o*)), and the ventilation device No. 2 (N2) and the ventilation device No. 4 (N4) are set to be the "destinations" (destination ventilation devices (20-*s*)). The ventilation device No. 3 (N3) is set to be "independent" (independent ventilation device (20-*i*)) which is neither a source nor a destination.

In this case, the second transmitter-receiver (64) transmits the detection signal (d1) of the ventilation device No. 1 (N1) serving as the source to the ventilation source No. 1 (N1) serving as the source, and to the ventilation device No. 2 (N2) and the ventilation device No. 4 (N4) serving as destinations. Therefore, the ventilation device No. 1 (N1), the ventilation device No. 2 (N2), and the ventilation device No. 4 (N4) are controlled based on the detection signal (d1).

The second transmitter-receiver (64) also receives a detection signal (d3) of the ventilation device No. 3 (N3). The second transmitter-receiver (64) transmits, to the first transmitter-receiver (53) of the ventilation device No. 3 (N3), the detection signal (d3) of the ventilation device No. 3 (N3) set to be "independent." The control device (50) associated with the ventilation device No. 3 (N3) controls the ventilation device No. 3 (N3) based on the detection signal (d3) rewritten in this manner. Accordingly, the ventilation device No. 3 (N3) set to be "independent" is controlled based on the detection signal (d3) of the second carbon dioxide concentration sensor (40*b*) connected to the ventilation device No. 3 (N3) itself.

Turning Each Ventilation Device On and Off

In the ventilation system (10) of the present embodiment, the operation of turning all of the ventilation devices (20) on and the operation of turning all of the ventilation devices (20) off are switched. That is, the second transmitter-receiver (64) of the remote control (60) transmits, to the control device (50) of each ventilation unit (U), an operation command for turning all of the ventilation devices (20) on and an operation command for turning all of the ventilation devices (20) off. On the other hand, the remote control (60) does not transmit an operation command for turning on some of the ventilation devices (20) and turning off the rest of the ventilation devices (20).

If such an operation is performed that turns off the source ventilation device (20-*o*) to which the carbon dioxide concentration sensor (40) is attached and turns on the destination ventilation devices (20-*s*) with which the detection signal is shared, a correct detection signal cannot be sent to the control device (50) of the destination ventilation device (20-*s*). As a result, the destination ventilation devices (20-*s*) cannot be appropriately controlled. Such a problem may be reliably avoided by forbidding the operation of turning on some of the ventilation devices (20) and turning off the rest of the ventilation devices (20).

Advantages of Embodiment

According to the above embodiment, the detection signal of the carbon dioxide concentration sensor (40) associated with the source ventilation device (20-*o*) is transmitted from the second transmitter-receiver (64) to each of the control devices (50) of the source ventilation device (20-*o*) and the destination ventilation devices (20-*s*). The source ventilation device (20-*o*) and the destination ventilation device (20-*s*) control the corresponding ventilation devices (20) based on the detection signal. Therefore, according to the present embodiment, it is possible to control each ventilation device (20) without providing the carbon dioxide concentration sensor (40) to each of the ventilation devices (20). As a result, it is possible to reduce the number of carbon dioxide concentration sensors (40).

According to the embodiment, the second transmitter-receiver (64) of the remote control (60) transmits and receives the detection signal. Therefore, it is possible to use a line as the line for transmitting the operation command from the remote control (60) and the line for transmitting and receiving the detection signal, making it possible to reduce the number of components.

According to the embodiment, the remote control (60) is provided with the setting unit (63) for setting the source ventilation device (20-*o*) and the destination ventilation devices (20-*s*). Such settings can be easily made through the operation unit (62) of the remote control (60).

In the setting unit (63), settings of the source ventilation device (20-*o*) or the destination ventilation device (20-*s*) may be freely changed. Thus, if the carbon dioxide concentration sensor (40) is relocated to another ventilation device (20) due to, for example, a layout change of the indoor space, the source ventilation device (20-*o*) and the destination ventilation device (20-*s*) may be easily changed accordingly.

According to the embodiment, the independent ventilation device (20-*i*) that serves neither as a source sharing with others a carbon dioxide concentration sensor (40) nor as destinations using the carbon dioxide concentration sensor (40) in common may be set in the setting unit (63). As a result, the ventilation device (20) may be controlled based on its own carbon dioxide concentration sensor (40).

According to the above embodiment, the operation to turn on some of the ventilation devices (20) and turn off the rest of the ventilation devices (20) is forbidden. It is therefore possible to reliably avoid the situation in which the source ventilation device (20-*o*) is stopped and the destination ventilation device (20-*s*) operates, and thus, the destination ventilation device (20-*s*) may be appropriately controlled.

Modification

In the above embodiment, the remote control (60) may be configured not to transmit the operation command for turning off the source ventilation device (20-*o*) and turning on the destination ventilation device (20-*s*). For example, if a case in which the source ventilation device (20-*o*) and the destination ventilation device (20-*s*) are set in the setting unit (63) of the remote control (60), the operation command is forbidden in accordance with the settings in the setting unit (63). Specifically, in the remote control (60), the operation command for turning off the source ventilation device (20-*o*) and turning on the destination ventilation device (20-*s*) is forbidden, whereas the operation command for turning on the source ventilation device (20-*o*) and turning off the destination ventilation device (20-*s*) is allowed. Even in this case, it is possible to reliably avoid the situation in which the source ventilation device (20-*o*) is stopped and the destination ventilation device (20-*s*) operates, and thus, the destination ventilation device (20-*s*) may be appropriately controlled. In addition, the ventilation operation may be performed when only the source ventilation device (20-*o*) is turned on, based on the carbon dioxide concentration sensor (40) of the source ventilation device (20-*o*).

Other Embodiments

The above embodiment and modification may be configured as follows.

The sensor may be a sensor other than the carbon dioxide concentration sensor (40) as long as it detects the state of air. For example, the sensor may be a temperature sensor for detecting the temperature of the air, a humidity sensor for detecting humidity of the air, an odor sensor for detecting an odor of the air, a concentration sensor for detecting concentration of the other substances in the air, or the like. Further, the sensor may detect the state of the outdoor air.

The first transmitter-receiver (53) may be configured such that a portion for receiving a signal and a portion for transmitting a signal are physically separate from each other. In this case, these portions are collectively referred to as the first transmitter-receiver (53). Likewise, the second transmitter-receiver (64) may be configured such that a portion for receiving a signal and a portion for transmitting a signal are physically separate from each other. In this case, these portions are collectively referred to as the second transmitter-receiver.

Each of the second transmitter-receiver (64) and the setting unit (63) are not necessarily provided in the remote control (60).

When the abnormality determination unit (65) outputs a signal indicating an abnormality, a warning or a notification may be sent to a maintenance company or the like.

While the embodiments and variations thereof have been described above, it will be understood that various changes in form and details may be made without departing from the spirit and scope of the claims. The foregoing embodiments and variations thereof may be combined and replaced with each other without deteriorating the intended functions of the present disclosure. The ordinals "first," "second," "third," and the like are used to distinguish the terms with the ordinals, and do not limit to the number and order thereof.

As described above, the present disclosure is useful for a ventilation system.

The invention claimed is:

1. A ventilation system comprising:

a first ventilation device including a first fan;

a second ventilation device including a second fan;

a sensor attached to the first ventilation device, the sensor being configured to detect a state of air and to transmit a detection signal indicative of the detected state of air; and an electronic controller configured to receive the detection signal of the sensor and to transmit the received detection signal to the first ventilation device and the second ventilation device, the first ventilation device and the second ventilation device being controlled based on the detection signal received from the electronic controller.

2. The ventilation system of claim 1, wherein the electronic controller is further configured to not transmit an operation command to turn off the first ventilation device and to turn on the second ventilation device.

3. The ventilation system of claim 1, wherein the electronic controller is further configured to transmit a first operation command to turn on the first and second ventilation devices and a second operation command to turn off the first and second ventilation devices.

4. The ventilation system of claim 1, wherein the electronic controller further includes an abnormality determination unit, the abnormality determination unit being configured to output a signal indicating an abnormality when the electronic controller does not receive the detection signal from the sensor of the first ventilation device.

5. A ventilation system comprising:
a first ventilation device including a first fan and a first electronic controller;
a second ventilation device including a second fan and a second electronic controller;
a sensor attached to the first ventilation device, the sensor is configured to detect a state of air and to transmit a detection signal indicative of the detected state of air; and
a third electronic controller configured to receive the detection signal of the sensor and to transmit the detection signal to the first electronic controller and the second electronic controller;
the first electronic controller being configured to control the first ventilation device based on the detection signal transmitted from the third electronic controller, and
the second electronic controller being configured to control the second ventilation device based on the detection signal transmitted from the third electronic controller.

6. The ventilation system of claim 5, wherein
the first electronic controller is further configured to not transmit an operation command to turn off the first ventilation device and to turn on the second ventilation device.

7. The ventilation system of claim 5, wherein
first electronic controller is further configured to transmit a first operation command to turn on the first and second ventilation devices and a second operation command to turn off the first and second ventilation devices.

8. The ventilation system of claim 5, wherein
the first electronic controller further includes an abnormality determination unit,
the abnormality determination unit being configured to output a signal indicating an abnormality when the first electronic controller does not receive the detection signal from the sensor of the first ventilation device.

* * * * *